(12) United States Patent
Panopoulos

(10) Patent No.: US 7,641,372 B2
(45) Date of Patent: Jan. 5, 2010

(54) MACHINE PROVIDING FOR AN ADVANCED HEADLAMP SYSTEM WITH PERIPHERAL BEAM TECHNOLOGY

(76) Inventor: Peter Panopoulos, 9220 S. 87$^{th}$ Ct., Hickory Hills, IL (US) 60457

( * ) Notice: Subject to any disclaimer, the term of this patent is extended or adjusted under 35 U.S.C. 154(b) by 310 days.

(21) Appl. No.: 11/653,023

(22) Filed: Jan. 12, 2007

(65) Prior Publication Data

US 2007/0109801 A1    May 17, 2007

Related U.S. Application Data

(63) Continuation-in-part of application No. 10/885,222, filed on Jul. 6, 2004, now abandoned.

(60) Provisional application No. 60/485,498, filed on Jul. 8, 2003.

(51) Int. Cl.
| | |
|---|---|
| F21V 29/00 | (2006.01) |
| F21S 8/10 | (2006.01) |
| F21V 11/00 | (2006.01) |
| F21V 21/00 | (2006.01) |
| F21V 19/02 | (2006.01) |
| F21V 21/14 | (2006.01) |

(52) U.S. Cl. .................. 362/544; 362/473; 362/523; 362/525; 362/543

(58) Field of Classification Search .......... 362/459–549
See application file for complete search history.

(56) References Cited

U.S. PATENT DOCUMENTS

| | | | | |
|---|---|---|---|---|
| 3,759,084 | A * | 9/1973 | Plewka | 362/235 |
| 5,099,400 | A * | 3/1992 | Lee | 362/467 |
| 5,426,571 | A * | 6/1995 | Jones | 362/466 |
| 6,367,950 | B1 * | 4/2002 | Yamada et al. | 362/545 |
| 6,623,147 | B2 * | 9/2003 | Hayami et al. | 362/524 |
| 2001/0019486 | A1 * | 9/2001 | Thominet | 362/543 |

* cited by examiner

*Primary Examiner*—Sandra L O'Shea
*Assistant Examiner*—William J Carter
(74) *Attorney, Agent, or Firm*—Justin Lampel

(57) ABSTRACT

An advanced headlamp system is proposed for providing a headlamp assembly for vehicles that has peripheral beam technology built in that has a multiplicity of filaments and reflectors built in to provide at least one forward beam and at least one or more peripheral light beams offset in angles to the left (for the driver side) and to the right (for the passenger side) of the forward beam in each assembly each also having a low-beam and a high-beam. The filaments and reflectors are located within a single sealed compartment. An example of a headlamp depicted would have (3) light filament bulbs, (3) reflectors, one pointing forward, one at a 45-degree angle, and one at a 90-degree angle. Included are circuitry and switches to program and to turn the bright lights and the peripheral beam system on or off and to turn the beams on or off automatically when an oncoming car comes within a certain distance.

11 Claims, 4 Drawing Sheets

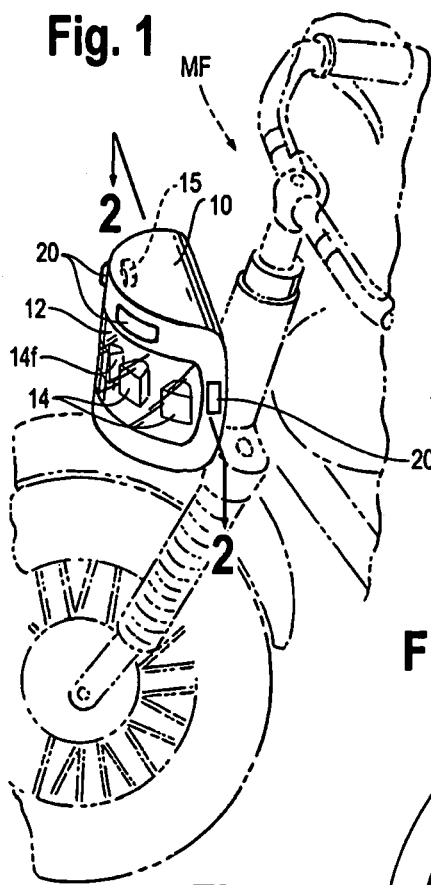
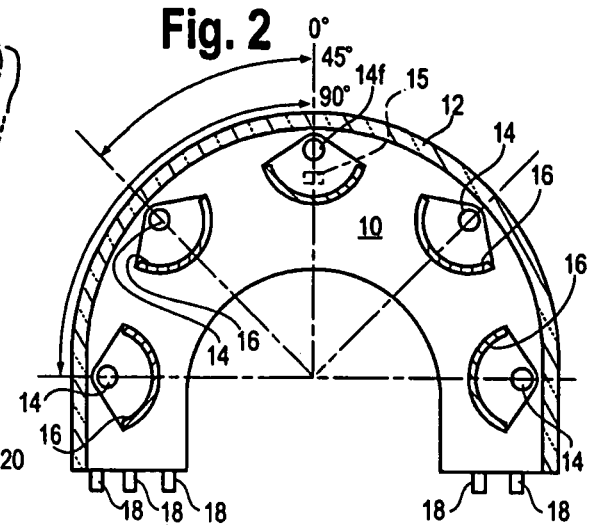
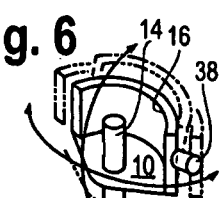
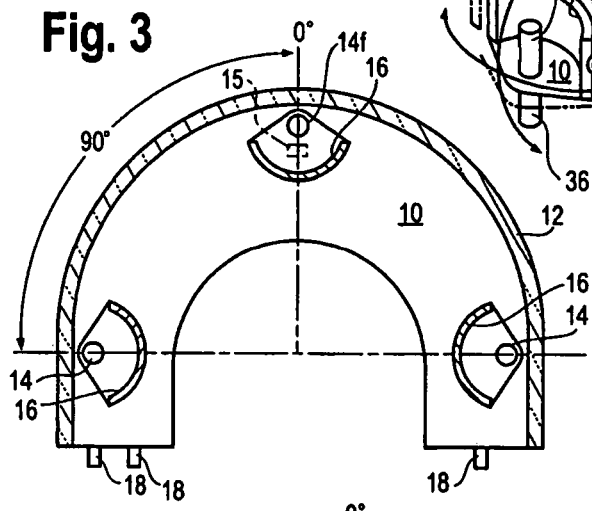
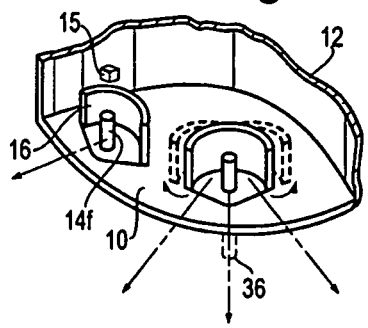
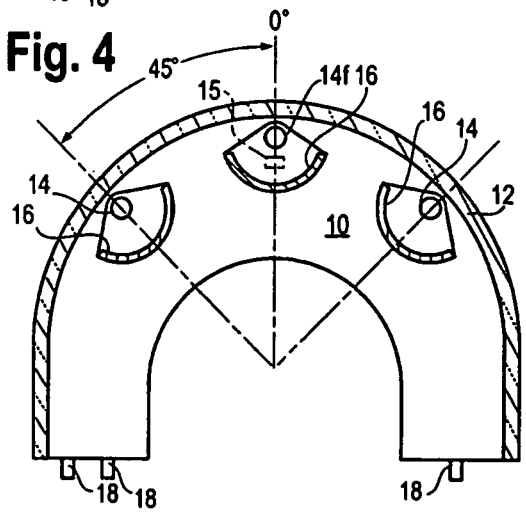
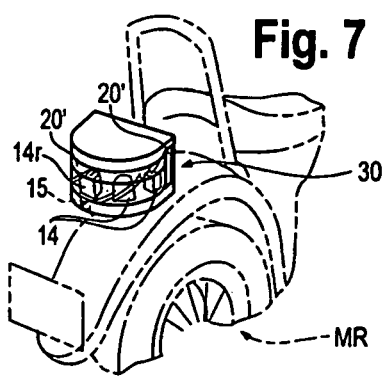

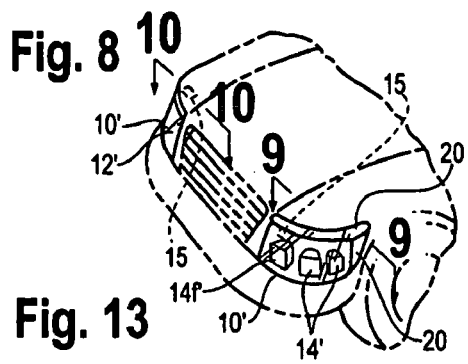
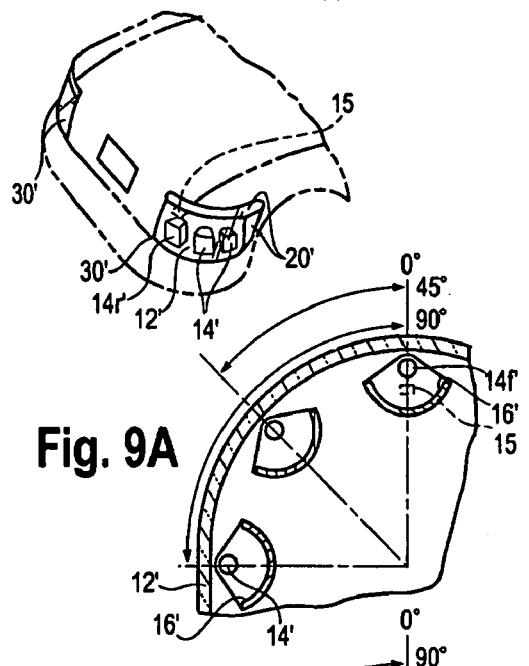
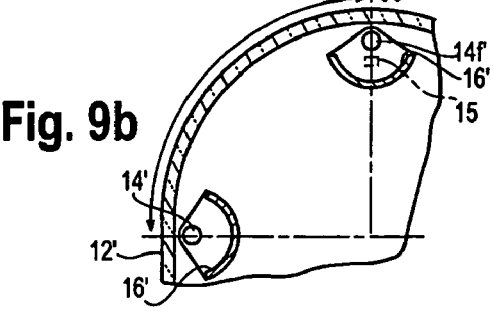
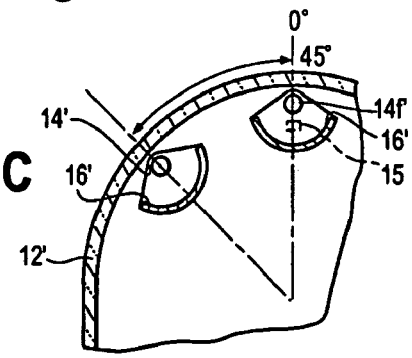
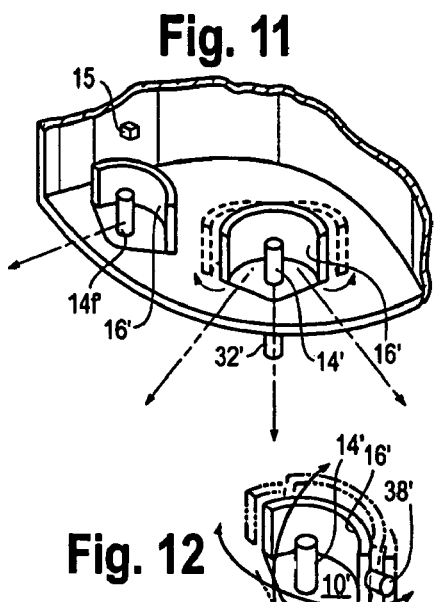
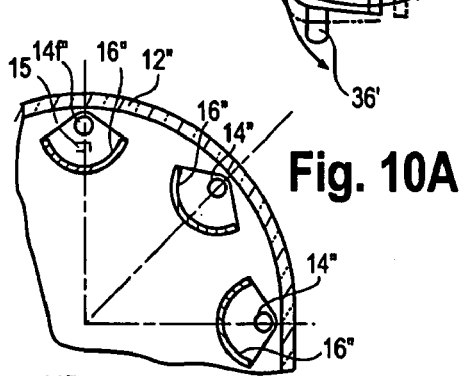
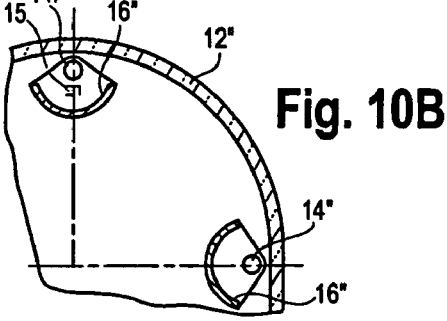
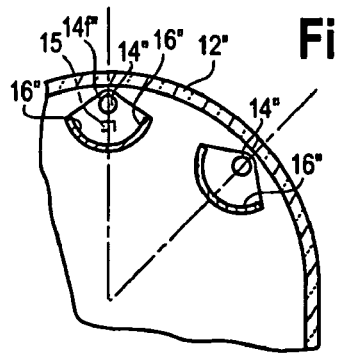

MACHINE PROVIDING FOR AN ADVANCED HEADLAMP SYSTEM WITH PERIPHERAL BEAM TECHNOLOGY

CROSS REFERENCE TO RELATED APPLICATIONS

This application is a Continuation-In-Part application of U.S. Ser. No. 10/885,222 filed on Jul. 6, 2004 now abandoned, which was based on provisional application Ser. No. 60/485,498, filed on Jul. 8, 2003. This application claims the benefit of the previous filing dates.

The present invention relates generally to an advanced headlamp system and more specifically it relates to an advanced headlamp system with peripheral beam technology for providing a headlamp assembly for vehicles that has peripheral beam technology built into it that has a multiplicity of light filament bulbs and reflectors built into each headlamp housing unit to provide one or more forward beam and at least one or more peripheral beam light filament(s) offset in angles to the left (for the driver side) and to the right (for the passenger side) of the forward beam in each assembly each also having a low-beam and a high-beam to focus and direct additional light beams and or patterns in areas not normally lit by conventional headlamp systems by providing additional light filament bulbs and light reflectors in the headlamp assembly. The housing is preferably a sealed compartment wherein the exchange of gas and/or air from the interior of the sealed compartment and exterior of the sealed compartment is limited or completely prevented. For the purpose of this application, the sealed compartment may be referred to as a housing. Thus, each headlamp assembly depicted here would have in this example (3) three light filament bulbs, and (3) light reflectors, one pointing forward, one at a 45/degree angle, and one at a 90-degree angle (or at other angles if other numbers of light filament bulbs are used; and if they are placed differently within the headlamp housing assembly to direct and focus light in peripheral angles from the forward directed light beam found in conventional headlamp systems). The driver side would have the 45-degree angled light filament bulb and reflector and the 90-degree angled light filament bulb and reflector pointing to the left, and the passenger side would have the 45-degree angled light filament bulb and reflector and the 90-degree light filament bulb and reflector pointing to the right. Other peripheral light beam designs may have more light filament bulbs and reflectors to the right and or to the left of the forward directed light filament bulb as in single headlamp systems as may be used in motorcycles where there may be a single headlamp design used in a vehicle whereby a 45-degree angled light filament bulb and reflector is positioned to the left and the right of the forward directed light filament bulb and reflector, and a 90-degree angled light filament bulb and reflector is positioned to the right. The degrees and the light patterns used in the design and the numbers of the light filament bulbs and the number of the reflectors used may also vary.

DESCRIPTION OF THE RELATED PRIOR ART

It can be appreciated that headlamps have been in use for years. Typically, headlamp systems are comprised of headlamps and headlamp systems for vehicles and motorcycles having low-beam and high-beam functionalities, and also fog lights and other such lighting systems for boats and other vehicles and methods of transportation where good lighting and visibility is a concern.

The main problem with conventional headlamp systems is that peripheral vision in vehicles is always a problem when driving in badly lit areas especially in forested areas where animals may run into the street or highway and or where poor lighting is a problem and or a concern and regular lighting, fog lighting, and or high-beams do not address the problem. Another problem with conventional headlamp systems are that regular headlamps do not allow you to control the extent of your peripheral vision, or the degree of your peripheral vision at night to extend your beam angle as desired to view a wider area as you travel as you might desire or to narrow it depending on what you want to view.

Another problem with conventional headlamp systems is that the headlamps available today do not have the functionality to allow you to easily view what is to the left or to the right of your vehicle in the darkness of your travel path at night with the touch of a left or right button, or with the touch of a special button that turns both sides on.

While these devices may be suitable for the particular purpose to which they address, they are not as suitable for providing an advanced headlamp assembly such as the one proposed here for vehicles to have a forward beam and peripheral beam technology built into them to have a multiplicity of light filament bulbs and reflectors built into each unit to provide at least one forward beam and at least (2) additional other beams offset in angles to the left (for the driver side) and to the right (for the passenger side) of the forward beam in each assembly each also having a low-beam and a high-beam. Thus, each headlamp assembly depicted here would have in this example (3) three filaments, and (3) reflectors, one pointing forward, one at a 45-degree angle, and one at a 90-degree angle. Other angles and numbers of light filament bulbs can be used as well, but (3) light filament bulbs are used throughout this document for our example. The driver side would have the 45-degree angled bulb and reflector and the 90-degree angled bulb and reflector pointing to the left, and the passenger side would have the 45-degree angled bulb and reflector and the 90-degree angled bulb and reflector pointing to the right. The main problem with conventional headlamp systems is that peripheral vision in vehicles is always a problem when driving in badly lit areas especially in forested areas where animals may run into the street or highway and or where poor lighting is a problem and or concern and regular lighting, fog lighting, and or high-beams do not address the problem. Another problem is that regular headlamps do not allow you to control the extent of your peripheral vision, or the degree of your peripheral vision at night to extend your beam angle as desired to view a wider area as you travel as you might desire or to narrow it depending on what you want to view.

Also, another problem is that the headlamps available today do not have the functionality to allow you to easily view what is to the left or to the right of your vehicle in the darkness of your travel path at night with the touch of a left or right button, or with the touch of a special button that turns both sides on.

In these respects, the advanced headlamp system with peripheral beam technology according to the present invention substantially departs from the conventional concepts and designs of the prior art, and in so doing provides an apparatus primarily developed for the purpose of providing a headlamp assembly for vehicles that has peripheral beam technology built into it and that has a multiplicity of light filament bulbs and reflectors built into each headlamp assembly unit to provide at least one forward beam and at least one or more peripheral beam filaments with dedicated reflectors offset in angles to the left (for the driver side) and to the right (for the passenger side) of the forward beam in each headlamp assembly unit each also having a low-beam and a high-beam. Thus, each headlamp assembly depicted here would have in this example (3) three filaments, and (3) reflectors, one pointing forward, one at a 45-degree angle, and one at a 90-degree angle. The driver side would have the 45-degree angle and the 90-degree angle pointing to the left, and the passenger side would have the 45-degree angle and the 90-degree reflector pointing to the right. However, it should be noted that the number and angle of the peripheral beam filament bulb(s) with dedicated reflector(s) can vary in each headlamp housing unit.

Other models such as motorcycles, where there is only one headlamp in front of the vehicle, would have a special headlamp where there would be at least three light filament bulbs one for a forward light beam, one for a left peripheral beam and one for a right peripheral beam where both peripheral beams are offset at 45 degrees from the forward driving beam or where the peripheral beams can be offset at other angles to cover different angles and patterns of light whereby the reflector(s) can shine light to reflect and cover different areas or where there can be five (5) light filament bulbs in one headlamp assembly: where contained in one headlamp assembly there would be one forward light filament bulb and its reflector, there would be a left 45-degree angled light filament and its reflector, there would be a left 90-degree light filament bulb and its reflector, and there would be a right 45-degree light filament bulb and its reflector and an 90-degree light filament bulb and its reflector (all the light filament bulbs would have both low-beam and high-beam functionalities and capabilities, like conventional headlamp assemblies). It should be noted that there can be many angles and reflectors in every headlamp design to reflect and cover-different areas as may be desired and to have one or more peripheral beams in each headlamp housing in addition to the forward driving beam.

In view of the foregoing disadvantages inherent in the known types of headlamp systems now present in the prior art, the present invention provides a new advanced headlamp system with peripheral beam technology construction wherein the same can be utilized for providing an advanced headlamp assembly for vehicles that has peripheral beam technology built into it and that has a multiplicity of filaments and reflectors built into each unit to provide at least one forward beam and at least one or more additional other beams offset in angles to the left (for the driver side) and to the right (for the passenger side) of the forward beam in each assembly each also having a low-beam and a high-beam. Thus, each headlamp assembly depicted here would have in this example (3) three filaments, and (3) reflectors, one pointing forward, one at a 45-degree angle, and one at a 90-degree angle. The driver side would have the 45-degree angle and the 90-degree angle pointing to the left, and the passenger side would have the 45-degree angle and the 90-degree reflector pointing to the right.

The general purpose of the present invention, which will be described subsequently in greater detail, is to provide a new advanced headlamp system with peripheral beam technology that has many of the advantages of the advanced headlamp system mentioned heretofore and many novel features that result in a new advanced headlamp system with peripheral beam technology which is not anticipated, rendered obvious, suggested, or even implied by any of the prior art advanced headlamp system, either alone or in any combination thereof.

To attain this, the present invention generally comprises a headlamp housing, at least (3) three light filaments, at least (3) three filament reflectors, and the electrical connectors that connect to the electrical system of the vehicle. Also circuitry and switches to program and to turn the bright lights and the peripheral beams on or off and to turn the beams on or off automatically when an oncoming car comes within a certain programmable distance.

The headlamp housing, can contain (3) three light filament bulbs, the forward light filament bulb, the 45-degree light filament bulb, and the 90-degree light filament bulb, or other configurations whereby there is at least a headlamp housing unit in all configurations with a forward driving filament and at least one or more peripheral light filaments with dedicated reflectors in each headlamp housing. It also contains the light filament reflectors that shape the angle of the light that the light will shine at for each filament.

The headlamp housing also contains the electrical connections that connect to the electrical system of the vehicle to turn the light beams on or off selectively as indicated in the specification. The light filament bulbs are powered by the vehicle's power system when they are connected to the electrical system of the vehicle and they are connected and installed into the headlamp housing. There are at least (2) two to (3) three light filament bulbs per headlamp housing. to create a headlamp with peripheral beam technology capability to compose a headlamp with at least a forward driving light filament beam and at least one or more peripheral light filament beam(s) per headlamp. Three light filaments are suggested and are built into each headlamp housing, one for a forward beam, one at a 45-degree angle (pointing right for passenger, pointing left for driver side), one at a 90-degree angle (pointing right for passenger, pointing left for driver side). The filament reflectors are connected and installed into the headlamp housing behind the light filaments. There are as many filament reflectors as there are light filaments per headlamp housing to create a headlamp with peripheral beam technology capability.

In car designs, three light reflectors and filaments are suggested and are built into each headlamp housing, one for a forward beam, one at a 45-degree angle (pointing right for passenger, pointing left for driver side), one at a 90-degree angle (pointing right for passenger, pointing left for driver side).

The electrical connectors of the headlamp assembly connect the forward light beam filament, the 45-degree light filament, and the 90-degree light filament, or the other configurations that may be available, to the power system of the vehicle through the circuit system of the vehicle, subject to the controls, switches, and the programmable settings of the headlamp system as indicated.

The circuit card of the headlamp system allows the programmability of the headlamp system to allow the driver to set the headlamp system to turn off the bright lights or the peripheral beams of the headlamp system at a certain distance when an oncoming car approaches utilizing a motion sensor, or an infra-red sensor, or another type of sensor.

The switching means of the headlamp system contains a switch that allows a rotary switch when turned to first turn on the parking lights then the forward lights, then when turned a little more, it turns on the next peripheral beam which may be the 45-degree beam, then when turned a little more it turns on the 90-degree peripheral beam. Clicking that lever that the rotary switch is on can also turn on the high beam for every beam.

The oncoming car sensor, motion sensor, infra-red sensor, or other type of sensor, (an optional feature), utilizing the logic circuits in the circuit card, provides a signal to the headlamp system when an oncoming car approaches when it comes within a certain distance as programmed to optionally turn off the bright lights of the vehicle, or to optionally turn off the peripheral beam technology.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a advanced headlamp system with peripheral beam technology that will overcome the shortcomings of the prior art devices.

An object of the present invention is to provide an advanced headlamp system with peripheral beam technology for providing a headlamp assembly for vehicles that has peripheral beam technology built into it and that has a multiplicity of light filament bulbs and reflectors built into each unit to provide at least one forward beam and at least (2) additional other beams offset in angles to the left (for the driver side) and to the right (for the passenger side) of the forward beam in each assembly each also having a low-beam and a high-beam. Thus, each headlamp assembly depicted here would have in this example (3) three filaments, and (3) reflectors, one pointing forward, one at a 45-degree angle, and one at a 90-degree angle. The driver side would have the 45-degree angle and the 90-degree angle pointing to the left, and the passenger side would have the 45-degree angle and the 90-degree reflector pointing to the right. It is understood and appreciated that the advanced headlamp system can be designed with more than 2 additional peripheral light filament bulbs and reflectors within the headlamp housing in addition to the forward beam to provide multiple beams beyond the 45-degree and the 90-degree examples mentioned here, but these are suggested engineering guidelines throughout this document. (Thus, please note that these angles can vary and the number of light filaments bulbs and reflectors used beyond the forward light filament bulb can vary as long as multiple light filament bulbs and reflectors are used to produce a multiple peripheral beam effect.).

Other models such as motorcycles, where there is only one headlamp in front of the vehicle, would have a special headlamp where there would be at least (5) light filament bulbs in one headlamp assembly.

Contained in one headlamp assembly there would be one forward light filament bulb and its reflector, there would be a left 45-degree angled light filament and its reflector, there would be a left 90-degree light filament bulb and its reflector, and there would be a right 45-degree light filament bulb and its reflector and an 90-degree light filament bulb and its reflector (all the light filament bulbs would have both low-beam and high-beam functionalities and capabilities, like conventional headlamp assemblies).

Another object is to provide an advanced headlamp system with peripheral beam technology that will provide light through a newly designed headlamp system and headlamp assembly containing both regular beam and high beam light filament bulbs as regular headlamp have having reflectors and assemblies as other headlamps and systems on the market, but having multiple reflectors and filaments positioned within the headlamp assembly to: 1) provide light in the forward direction, and filaments and reflectors built into the headlamp assembly to provide light in 2) angled directions proceeding outwardly from the forward direction proceeding to the left on the driver's side containing at least one or more extra filaments and reflectors to the left and to the right on the passenger's side. These extra filaments and reflectors may be placed and angled one to shine light in the forward direction as mentioned, the second to shine light at 45-degrees left on the driver's side of the vehicle, and the third filament and reflector may shine light at 90-degrees of the forward shining reflector and filament.

The same approach may be used on the passenger side with the opposite configuration where there will be a forward filament and reflector, one that shines 45-degrees to the right on the passenger's side, and one 90-degrees from the forward shining reflector and filament (the number of light filament bulbs and reflectors used and the angles of the light beams and how the light shines from them and their patterns may and can vary).

Another object is to provide an advanced headlamp system with peripheral beam technology that will allow headlamp assemblies to be constructed with multiple filaments and reflectors housed within each headlamp for multiple peripheral beam angles as mentioned: with at least a forward pointing light filament bulb and reflector, a 45-degree angled light filament bulb and reflector, and a 90-degree angled light filament bulb and reflector; one for the driver side and one for the passenger side. (It is further conceived hereby that other angles and greater numbers of filaments and reflectors can be built into the headlamp assembly but three seem to be the best number for manufacturing and value).

Another object is to provide an advanced headlamp system with peripheral beam technology that allows a driver to turn the peripheral beams of the headlamps on or off selectively by tripping switches on or off, whether there are one or more peripheral beams, on or off and to select which beams they want on or off. The driver can select whether he or she wants the forward lights on, whether he or she wants the 45-degree lights on as well, and or whether he or she also wants the 90-degree beams on, or any combination, or each, or all. Any type of switching means may be used.

Another object of my invention is to provide a switch that allows a rotary switch when turned to first turn on the parking lights then the forward lights, then when turned a little more, it turns on the next peripheral beam which may be the 45-degree beam, then when turned a little more it turns on the 90-degree peripheral beam. Clicking that lever that the rotary switch is on can also turn on the high beam for every beam.

Another object is to provide an advanced headlamp system with peripheral beam technology that performs these functions for all vehicles including motorcycles, vans, cars, trucks, busses, military vehicles, boats, yachts, ships, planes, etc.

Another object is to provide a advanced headlamp system with peripheral beam technology that performs these functions for all types of lighting technologies used in headlamp assemblies in the industry, by combining the light filament bulbs used and by adding reflectors and angling them together in a headlamp housing to put together for the intended effect to light the sides of the vehicle when driving for aiding peripheral vision and adding peripheral beams and controlling their use by turning them on or off through circuits and switching means as indicated.

Another object is to provide an advanced headlamp system with peripheral beam technology that will provide peripheral lighting mounted on the passenger or the driver side of vehicles to turn on or off when a driver utilizes switching means to turn the peripheral beams on or off as indicated.

Another object is to provide an advanced headlamp system with peripheral beam technology that will optionally turn off the bright lights or the peripheral beams of the vehicle when an oncoming car approaches within a certain programmed distance.

Another object of my invention is to provide a headlamp system with the logic circuits and the buttons and the display panels and circuitry required that will allow the driver to set the system to program the headlamp system to set it to automatically control how far an oncoming car must be for the bright lights or for the peripheral light beams to be turned off automatically.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

Figure 14:
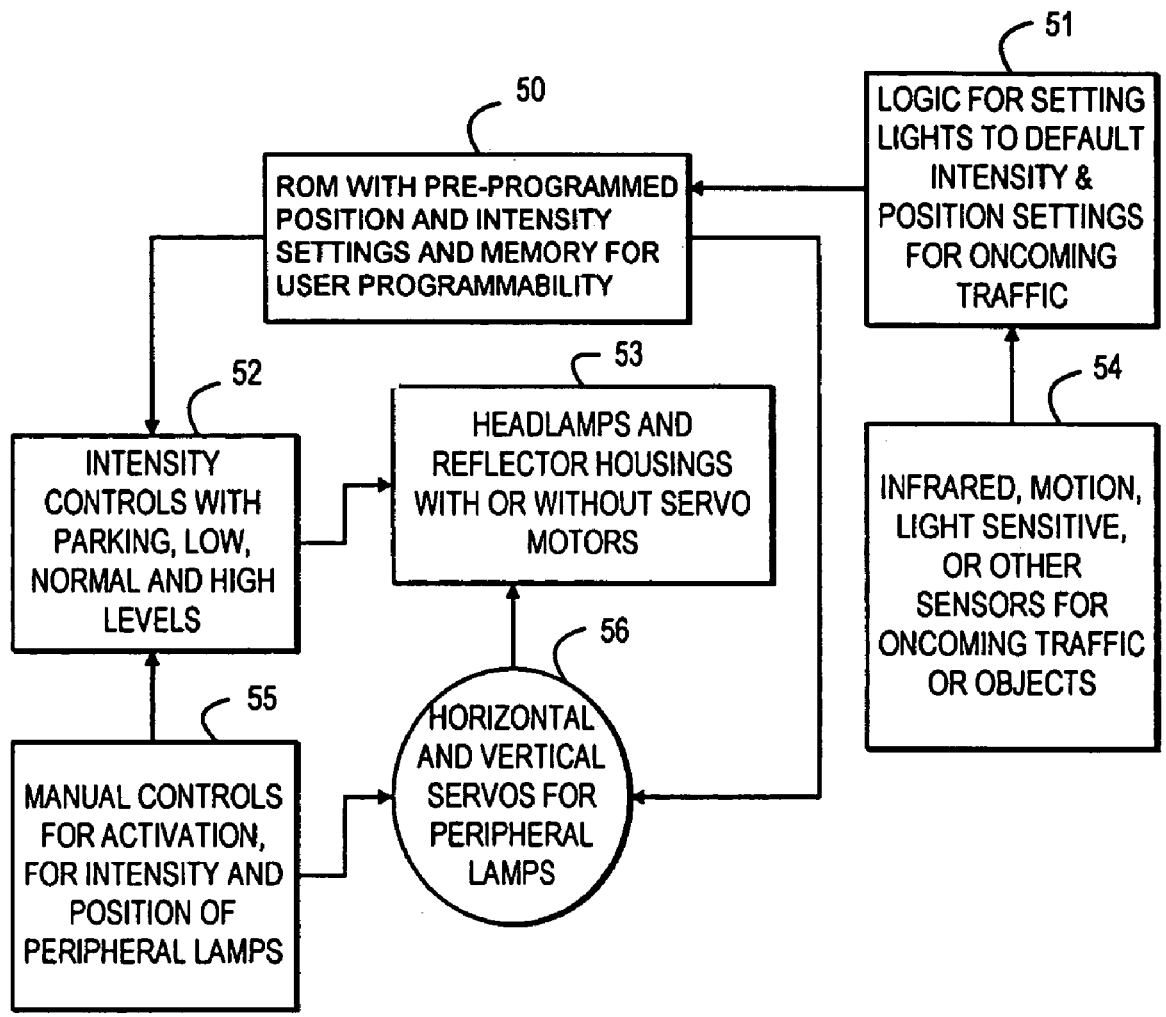

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 is a perspective view of a peripheral beam advanced headlamp system shown on the front of a motorcycle.

FIG. 2 is a horizontal cross-section view of a peripheral beam advanced headlamp system of a motorcycle variation taken along view lines 2-2 of FIG. 1.

FIG. 3 is an alternate embodiment of a peripheral beam advanced headlamp for a motorcycle showing a cross-section view from FIG. 1.

FIG. 4 is another alternate embodiment of a peripheral beam advanced headlamp system for a motorcycle showing a cross-section view from FIG. 1.

FIG. 5 is a fragmentary perspective view of a peripheral beam advanced headlamp system showing horizontal swiveling of one light assembly.

FIG. 6 is a fragmentary perspective view of a peripheral beam advanced headlamp system showing bi-directional swivelling of the light beam/reflector unit within the headlamp housing in both horizontal and in vertical directions.

FIG. 7 is a perspective view of a tail light system having peripheral beam technology built into it embodying features of the advanced headlamp system shown on the rear of a motorcycle.

FIG. 8 is a fragmentary perspective view of a peripheral beam advanced headlamp system shown on the front of an automobile.

FIG. 9A is a horizontal cross-section view of a peripheral beam advanced headlamp system of a motor vehicle variation taken along view lines 9-9 of FIG. 8.

FIG. 9B is an alternate embodiment of a peripheral beam advanced headlamp for a motor vehicle variation showing a cross-section view from FIG. 8.

FIG. 9C is another alternate embodiment of a peripheral beam advanced headlamp system for a motorcycle showing a cross-section view from FIG. 8.

FIG. 10A is a horizontal cross-section view of a peripheral beam advanced headlamp system of a motor vehicle variation taken along view lines 10.sup.-10 of FIG. 8.

FIG. 10B is an alternate embodiment of a peripheral beam advanced headlamp for a motor vehicle variation showing a cross-section view from FIG. 8.

FIG. 10C is another alternate embodiment of a peripheral beam advanced headlamp system for a motorcycle showing a cross-section view from FIG. 8.

FIG. 11 is a fragmentary perspective view of a peripheral beam advanced headlamp system showing horizontal swiveling of one light assembly.

FIG. 12 is a fragmentary perspective view of a peripheral beam advanced headlamp system showing bi-directional swivelling of the light beam/reflector unit within the headlamp housing in both horizontal and in vertical directions.

FIG. 13 is a fragmentary perspective view of the advanced headlamp system shown on the rear of an automobile as a tail light assembly having peripheral beam technology.

FIG. 14 is a logic circuit block diagram of the advanced headlamp system having peripheral beam technology.

Figure 15:
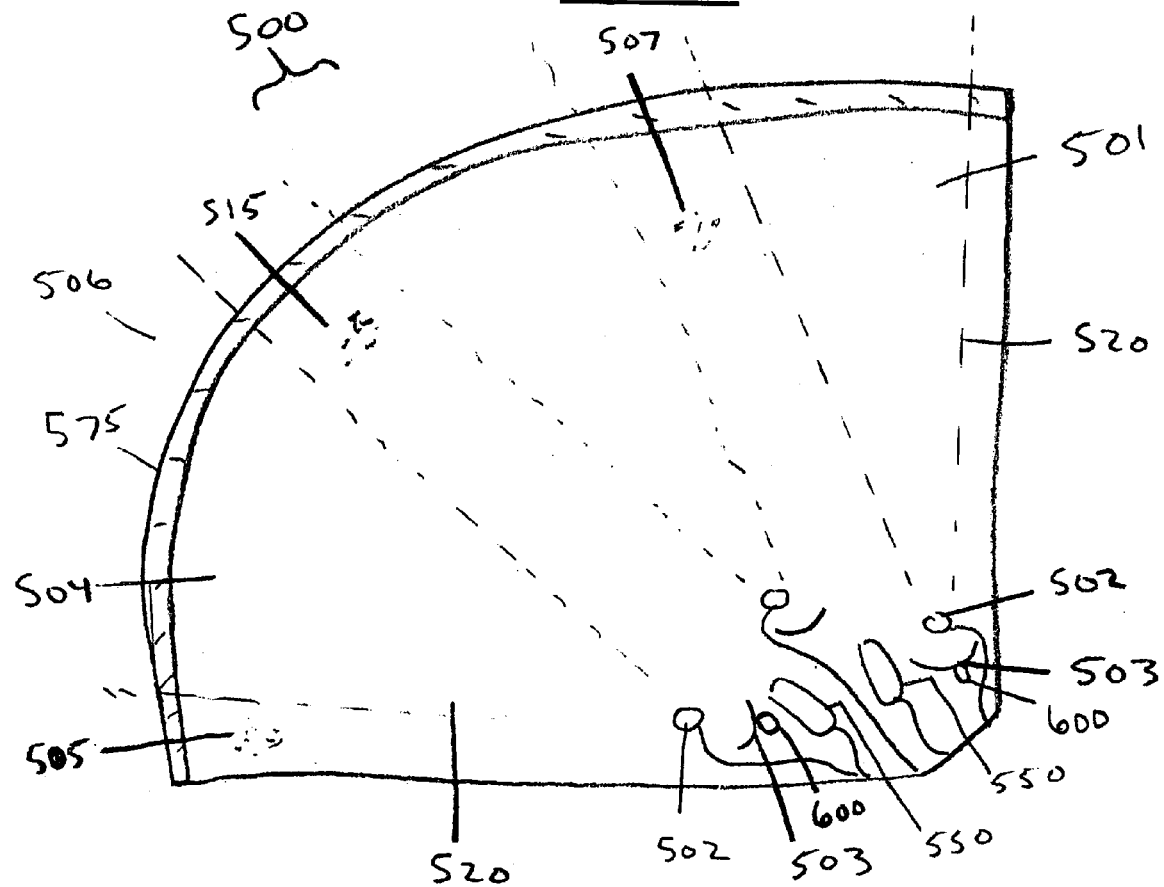

FIG. 15 is a view of the headlamp system illustrating the sensors and multiple reflective surfaces and servos.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

DETAILED DESCRIPTION OF THE INVENTION

Turning now descriptively to the drawings, in which similar reference characters denote similar elements throughout the several views, the attached figures illustrate a advanced headlamp system with peripheral beam technology, which comprises a headlamp housing, at least one or more three light filament bulbs, at least one or more light filament reflectors, and the electrical connectors that connect to the electrical system of the vehicle. Also circuitry and switches to program and to turn the bright lights and the peripheral beam system on or off and to turn the beams on or off automatically when an oncoming car comes within a certain distance.

FIG. 1 depicts a peripheral beam advanced headlamp system with a "headlamp housing" 10 shown on "MF" the front of a motorcycle "which contains a forward drivinglight beam filament 14*f* and its dedicated light reflector behind it to shine light in the forward direction and additional "peripheral light beam filaments" 14 each of which can be turned on and off selectively and made to switch from parking lights status, to normal, to low or bright lights status through switching means. Also shown in the drawing are "turning light signal indicators" 20 built into the "headlamp housing" 10 and a motion, infrared, optoelectronic or other type of "sensor" 15 to detect oncoming cars to turn off peripheral beams automatically or to turn off brights if this option is chosen. However, it should be noted that a driver can overide this function through manual means or automatic means to defeat the sensor peripheral/bright "off" function when oncoming cars approach if desired if allowed by law.

FIG. 2 is a horizontal cross-section view of a peripheral beam advanced headlamp system of a motorcycle variation taken along view lines 2-2 of FIG. 1 whereby. in the cross section it is illustrated that there is a peripheral beam advanced headlamp system with a "headlamp housing" 10 shown for a motorcycle which contains a forward driving light beam filament 14*f* and its dedicated light reflector behind it to shine light in the forward direction and additional "peripheral light beam filaments" 14, where in this figure the additional peripheral beam filaments and reflectors are placed one to shine at 45 degrees and one at 90 degrees from the forward driving beam both on the left and on the right of the forward driving beam each of which can be turned on and off selectively and made to switch from parking lights status, to normal, to low or bright lights status through switching means. Not shown in FIG. 2 but that can be included are "turning signal indicators" 20 as such are shown in FIGS. 1, 8, and 13 with their respective electrode connections as "electrode connections" 18 for each of the light filament bulbs are shown in FIG. 2. Also shown in FIG. 2 is the headlamp housing "lens" 12 whereby the light of the light of the forward light filament bulbs and the peripheral light filament bulbs passes through the headlamp housing. It. should be noted that each advanced peripheral beam headlamp is comprised with at least one forward light filament beam 14*f* and its reflector 16 and that each advanced peripheral beam headlamp has at least one or more peripheral beams 14 in it placed at an angle from the forward driving beam to shine light in a peripheral direction to illuminate the sides of the vehicle as desired each having a dedicated reflector 16. Also shown in the drawing is a motion, infrared, optoelectronic or other type of "sensor" 15 to detect oncoming cars to turn off peripheral beams automatically or to turn off brights if this option is chosen. However, it should be noted that a driver can overide this function through manual means or automatic means to defeat the sensor peripheral/bright "off" function when oncoming cars approach if desired if allowed by law.

FIG. 3 is an alternate embodiment of a peripheral beam advanced headlamp for a motorcycle showing a cross-section view from FIG. 1 whereby in the cross section it is illustrated that there is a peripheral beam advanced headlamp system with a "headlamp housing" 10 shown for a motorcycle which contains a forward driving light beam filament 14*f* and its dedicated light reflector behind it to shine light in the forward direction and additional "peripheral light beam filaments" 14, where in this figure the additional peripheral beam filaments and reflectors are placed one to shine at 90 degrees from the forward driving beam both on the left and on the right of the forward driving beam each of which can be turned on and off selectively and made to switch from parking lights status, to normal, to low or bright lights status through switching means. Not shown in FIG. 3 but that can be included are "turning signal indicators" 20 as such were shown in FIGS. 1, 8, and 13 with their respective electrode connections as "electrode connections" 18 for each of the light filament bulbs are shown in FIG. 3. Also shown in FIG. 3 is the headlamp housing "lens" 12 whereby the light of the light of the forward light filament bulbs and the peripheral light filament bulbs passes through the headlamp housing. It should be noted that each advanced peripheral beam headlamp is comprised with at least one forward light filament beam 14*f* and its reflector 16 and that each advanced peripheral beam headlamp has at least one or more peripheral beams 14 in it placed at an angle from the forward driving beam to shine light in a peripheral direction to illuminate the sides of the vehicle as desired each having a dedicated reflector 16. Also shown in the drawing is a motion, infrared, optoelectronic or other type of "sensor" 15 to detect oncoming cars to turn off peripheral beams automatically or to turn off brights if this option is chosen. However, it should be noted that a driver can overide this function through manual means or automatic means to defeat the the sensor peripheral/bright "off" function when oncoming cars approach if desired if allowed by law.

FIG. 4 is another alternate embodiment of a peripheral beam advanced headlamp system for a motorcycle showing a cross-section view from FIG. 1 whereby in the cross section it is illustrated that there is a peripheral beam advanced headlamp system with a "headlamp housing" 10 shown for a motorcycle which contains a forward driving light beam filament 14*f* and its dedicated light reflector behind it to shine light in the forward direction and additional "peripheral light beam filaments" 14, where in this figure the additional peripheral beam filaments and reflectors are placed one to shine at 45 degrees from the forward driving beam both on the left and on the right of the forward driving beam each of which can be turned on and off selectively and made to, switch from parking lights status, to normal, to low or bright lights status through switching means. Not shown in FIG. 4 but that can be included are "turning signal indicators" as such are shown in FIGS. 1, 8, and 13 with their respective electrode connections as "electrode connections" 18 for each of the light filament bulbs are shown in FIG. 4. Also shown in FIG. 4 is the headlamp housing "lens" 12 whereby the light of the light of the forward light filament bulbs and the peripheral light filament bulbs passes through the headlamp housing. It should be noted that each advanced peripheral beam headlamp is comprised with at least one forward light filament beam 14*f* and its reflector 16 and that each advanced peripheral beam headlamp has at least one or more peripheral beams 14 in it placed at an angle from the forward driving beam to shine light in a peripheral direction to illuminate the sides of the vehicle as desired each having a dedicated reflector 16. Also shown in the drawing is a motion, infrared, optoelectronic or other type of "sensor" 15 to detect oncoming cars to turn off peripheral beams automatically or to turn off brights if this option is chosen. However, it should be noted that a driver can overide this function through manual means or automatic means to defeat the sensor peripheral/bright "off" function when oncoming cars approach if desired if allowed by law.

FIG. 5 is a fragmentary perspective view of a peripheral beam advanced headlamp system showing horizontal swiveling of one light assembly whereby it is illustrated that there is a peripheral beam advanced headlamp system with a "headlamp housing" 10 shown for motorcycles, or other vehicles, boats, or other applications which contains a forward driving light beam filament 14*f* and its dedicated light reflector behind it to shine light in the forward direction and additional "peripheral light beam filaments" 14, where in this figure the additional peripheral beam filaments and reflectors are placed one to shine at 45 degrees, or at other angle(s) from the forward driving beam on the left of the forward driving beam and where said peripheral beams in this example have a motorized mechanical "servo" 36 and or mechanisms that can rotate the light beam and or its reflector in a horizontal motion to vary the beam angle as desired and whereby the beams can be turned on and off selectively and made to switch from parking lights status, to normal, to low or bright lights status through switching means through electrode connectors 18 as shown in FIGS. 2, 3, and 4. Not shown in FIG. 5 but that can be included are turning signal indicators as such are shown in FIGS. 1, 8 and 13 with their respective electrode connections as "electrode connections" 18 for each of the light filament bulbs are shown in FIGS. 2, 3, and 4. Also shown in FIG. 5 is the headlamp housing "lens" 12 whereby the light of the light of the forward light filament bulbs and the peripheral light filament bulbs passes through the headlamp housing which in this drawing has been cut-away to show the swiveling action of the peripheral beams. It should be noted that each advanced peripheral beam headlamp is comprised with at least one forward light filament beam 14ƒ and its reflector 16 and that each advanced peripheral beam headlamp has at least one or more peripheral beams 14 in it placed at an angle from the forward driving beam to shine light in a peripheral direction to illuminate the sides of the vehicle as desired each having a dedicated reflector 16. Also shown in the drawing is a motion, infrared, optoelectronic or other type of "sensor" 15 to detect oncoming cars to turn off peripheral beams automatically or to turn off brights if this option is chosen. However, it should be noted that a driver can overide this function through manual means or automatic means to defeat the sensor peripheral/bright "off" function when oncoming cars approach if desired if allowed by law.

FIG. 6 is a fragmentary perspective view of a peripheral beam advanced headlamp system showing bi-directional swivelling of the light beam/reflector unit within the headlamp housing in both horizontal and in vertical directions whereby it is illustrated that there is a peripheral beam advanced headlamp system with a "headlamp housing" 10 shown for motorcycles, or other vehicles, boats, or other applications which contains a forward driving light beam filament 14ƒ and its dedicated light reflector behind it to shine light in the forward direction (not shown) and additional "peripheral light beam filaments" 14 (here one bidirectional swiveling unit is shown), where in this figure the additional peripheral beam filaments and reflectors can be placed to shine at 45 degrees, or at other angle(s) from the forward driving beam on the left of the forward driving beam and where said periperal beams in this example have a motorized horizontal electromechanical "servo" 36 and or mechanisms that can rotate the light beam and or its reflector in a horizontal motion and in a vertical motion through a vertical electromechanical servo 38 and or mechanisms to vary the light beam angle and or its reflector as desired and whereby the beams can be turned on and off selectively and made to switch from parking lights status, to normal, to low or bright lights status through switching means through electrode connectors 18 as shown in FIGS. 2, 3, and 4. Not shown in FIG. 6 but that can be included are units where this bi-directional swiveling peripheral beam can be incorporated to include "turning signal indicators" as such are shown in. FIGS. 1, 8 and 13 with their respective electrode connections as "electrode connections" 18 for each of the light filament bulbs as are shown in FIGS. 2, 3, and 4. It should be noted that each advanced peripheral beam headlamp is comprised with at least one forward light filament beam 14ƒ and its reflector 16 and that each advanced peripheral beam headlamp has at least one or more peripheral beams 14 in it placed at an angle from the forward driving beam to shine light in a peripheral direction to illuminate the sides of the vehicle as desired each having a dedicated reflector 16.

FIG. 7 is a perspective view of a tail light system having peripheral beam technology built into it embodying features of the advanced headlamp system shown on the rear of a motorcycle 30 whereby the drawing depicts a peripheral beam advanced headlamp system with a "headlamp housing" 10 as shown in FIG. 1 but depicting the "MR" (the motorcycle rear) which contains a backward or reverse driving light beam filament 14r and its dedicated light reflector behind it to shine light in the backward or reverse direction and additional "peripheral light beam filaments" 14 each of which can be turned on and off selectively and made to switch from parking lights status, to normal, to low or bright lights status through switching means. Also shown in the drawing are "turning light signal indicators" 20' built into the "headlamp housing" 10 and a motion, infrared, optoelectronic or other type of "sensor" 15 to detect oncoming cars to turn off peripheral beams automatically or to turn off brights if this option is chosen. However, it should be noted that a driver can overide this function through manual means or automatic means to defeat the sensor peripheral/bright "off" function when oncoming cars approach if desired if allowed by law.

FIG. 8 is a fragmentary perspective view of a peripheral beam advanced headlamp system shown on the front of an automobile whereby a "headlamp housing" 10 is shown containing a light filament beam 14ƒ that is a forward driving beam and peripheral light beams 14' placed at angles from the forward driving beam 14ƒ to fill the "headlamp housing" 10. Also contained in the headlamp housing are "turning light indicators" 20 as in the motorcycle variations of the advanced headlamp system with peripheral beam technology. Also shown in FIG. 8 is the headlamp housing "lens" 12 whereby the light of the light of the forward light filament bulbs and the peripheral light filament bulbs passes through the headlamp housing 10'.

FIG. 9A is a horizontal cross-section view of a peripheral beam advanced headlamp system of a motor vehicle variation taken along view lines 9-9 of FIG. 8 whereby in the cross section it is illustrated that there is a peripheral beam advanced headlamp system. within a "headlamp housing" shown for a motor vehicle which contains a forward driving light beam filament 14ƒ and its dedicated light reflector 16' behind it to shine light in the forward direction and additional "peripheral light beam filaments" 14', where in this figure the additional peripheral beam filaments and reflectors are placed one to shine at 45 degrees and one at 90 degrees from the forward driving beam on the left of the forward driving beam each of which can be turned on and off selectively and made to switch from parking lights status, to normal, to low or bright lights status through switching means. Not shown in FIG. 9A but that can be included are "turning signal indicators" 20 as such are shown in FIGS. 1, 8, and 13 with their respective electrode connections as "electrode connections" 18 for each of the light filament bulbs as are shown in FIGS. 2, 3 and 4. Also shown in FIG. 9A is the headlamp housing "lens" 12 whereby the light of the light of the forward light filament bulbs and the peripheral light filament bulbs passes through the headlamp housing. It should be noted that each advanced peripheral beam headlamp is comprised with at least one forward light filament beam 14ƒ and its reflector 16 and that each advanced peripheral beam headlamp has at least one or more peripheral beams 14 in it placed at an angle from the forward driving beam to shine light in a peripheral direction to illuminate the sides of the vehicle as desired each having a dedicated reflector 16. Also shown in the drawing is a motion, infrared, optoelectronic or other type of "sensor" 15 to detect oncoming cars to turn off peripheral beams automatically or to turn off brights if this option is chosen. However, it should be noted that a driver can overide this function through manual means or automatic means to defeat the sensor peripheral/bright "off" function when oncoming cars approach if desired if allowed by law.

FIG. 9B is an alternate embodiment of a peripheral beam advanced headlamp for a motor vehicle variation showing a cross-section view from FIG. 8 whereby in the cross section it is illustrated that there is a peripheral beam advanced headlamp system with a "headlamp housing" shown for a motor vehicle which contains a forward driving light beam filament 14*f* and its dedicated light reflector 16' behind it to shine light in the forward direction and additional "peripheral light beam filaments" 14', where in this figure the additional peripheral beam filaments and reflectors are placed one to shine at 90 degrees from the forward driving beam on the left of the forward driving beam each of which can be turned on and off selectively and made to switch from parking lights status, to normal, to low or bright lights status through switching means. Not shown in FIG. 9B but that can be included are "turning signal indicators" 20 as such were shown in FIGS. 1, 8, and 13 with their respective electrode connections as "electrode connections" 18 for each of the light filament bulbs are shown in FIGS. 2, 3, and 4. Also shown in FIG. 9B is the headlamp housing "lens" 12 whereby the light of the light of the forward light filament bulbs and the peripheral light filament bulbs passes through the headlamp housing. It should be noted that each advanced peripheral beam headlamp is comprised with at least one forward light filament beam 14*f* and its reflector 16 and that each advanced peripheral beam headlamp has at least one or more peripheral beams 14 in it placed at an angle from the forward driving beam to shine light in a peripheral direction to illuminate the sides of the vehicle as desired each having a dedicated reflector 16. Also shown in the drawing is a motion. infrared, optoelectronic or other type of "sensor" 15 to detect oncoming cars to turn off peripheral beams automatically or to turn off brights if this option is chosen. However, it should be noted that a driver can overide this function through manual means or automatic means to defeat the sensor peripheral/bright "off" function when oncoming cars approach if desired if allowed by law.

FIG. 9C is another alternate embodiment of a peripheral beam advanced headlamp system for a motorcycle showing a cross-section view from FIG. 8 whereby in the cross section it is illustrated that there is a peripheral beam advanced headlamp system with a "headlamp housing" shown for a motor vehicle which contains a forward driving light beam filament 14*f* and its dedicated light reflector 16' behind it to shine light in the forward direction and additional "peripheral light beam filaments" 14', where in this figure the additional peripheral beam filaments and reflectors are placed one to shine at 45 degrees from the forward driving beam on the left of the forward driving beam each of which can be turned on and off selectively and made to switch from parking lights status, to normal, to low or bright lights status through switching means. Not shown in FIG. 9C but that can be included are "turning signal indicators" as such are shown in FIGS. 1, 8, and 13 with their respective electrode connections as "electrode connections" 18 for each of the light filament bulbs are shown in FIGS. 2, 3 and 4. Also shown in FIG. 9C is the headlamp housing "lens" 12 whereby the light of the light of the forward light filament bulbs and the peripheral light filament bulbs passes through the headlamp housing. It should be noted that each advanced peripheral beam headlamp is comprised with at least one forward light filament beam 14*f* and its reflector 16 and that each advanced peripheral beam headlamp has at least one or more peripheral beams 14 in it placed at an angle from the forward driving beam to shine light in a peripheral direction to illuminate the sides of the vehicle as desired each having a dedicated reflector 16. Also shown in the drawing is a motion, infrared, optoelectronic or other type of "sensor" 15 to detect oncoming cars to turn off peripheral beams automatically or to turn off brights if this option is chosen. However, it should be noted that a driver can overide this function through manual means or automatic means to defeat the sensor peripheral/bright "off" function when oncoming cars approach if desired if allowed by law.

FIG. 10A is a horizontal cross-section view of a peripheral beam advanced headlamp system of a motor vehicle variation taken along view lines 10-10 of FIG. 8 whereby in the cross section it is illustrated that there is a peripheral beam advanced headlamp system within a "headlamp housing" shown for a motor vehicle which contains a forward driving light beam filament 14*f*" and its dedicated light reflector 16" behind it to shine light in the forward direction and additional "peripheral light beam filaments" 14", where in this figure the additional peripheral beam filaments and reflectors are placed one to shine at 45 degrees and one at 90 degrees from the forward driving beam on the right of the forward driving beam each of which can be turned on and off selectively and made to switch from parking lights status, to normal, to low or bright lights status through switching means. Not shown in FIG. 10A but that can be included are "turning signal indicators" 20 as such are shown in FIGS. 1, 8, and 13 with their respective electrode connections as "electrode connections" 18 for each of the light filament bulbs as are shown in FIGS. 2, 3 and 4. Also shown in FIG. 10A is the headlamp housing "lens" 12 whereby the light of the light of the forward light filament bulbs and the peripheral light filament bulbs passes through the headlamp housing. It should be noted that each advanced peripheral beam headlamp is comprised with at least one forward light filament beam 14*f* and its reflector 16 and that each advanced peripheral beam headlamp has at least one or more peripheral beams 14 in it placed at an angle from the forward driving beam to shine light in a peripheral direction to illuminate the sides of the vehicle as desired each having a dedicated reflector 16. Also shown in the drawing is a motion, infrared, optoelectronic or other type of "sensor" 15 to detect oncoming cars to turn off peripheral beams automatically or to turn off brights if this option is chosen. However, it should be noted that a driver can overide this function through manual means or automatic means to defeat the sensor peripheral/bright "off" function when oncoming cars approach if desired if allowed by law.

FIG. 10B is an alternate embodiment of a peripheral beam advanced headlamp for a motor vehicle variation showing a cross-section view from FIG. 8 whereby in the cross section it is illustrated that there is a peripheral beam advanced headlamp system with a "headlamp housing" shown for a motor vehicle which contains a forward driving light beam filament 14*f*" and its dedicated light reflector 16" behind it to shine light in the forward direction and additional "peripheral light beam filaments" 14", where in this figure the additional peripheral beam filaments and reflectors are placed one to shine at 90 degrees from the forward driving beam on the right of the forward driving beam each of which can be turned on and off selectively and made to switch from parking lights status, to normal, to low or bright lights status through switching means. Not shown in FIG. 10B but that can be included are "turning signal indicators" 20 as such were shown in FIGS. 1, 8, and 13 with their respective electrode connections as "electrode connections" 18 for each of the light filament bulbs are shown in FIGS. 2, 3, and 4. Also shown in FIG. 10B is the headlamp housing "lens" 12 whereby the light of the light of the forward light filament bulbs and the peripheral light filament bulbs passes through the headlamp housing. It should be noted that each advanced peripheral beam headlamp is comprised with at least one forward light filament beam 14f and its reflector 16 and that each advanced peripheral beam headlamp has at least one or more peripheral beams 14 in it placed at an angle from the forward driving beam to shine light in a peripheral direction to illuminate the sides of the vehicle as desired each having a dedicated reflector 16. Also shown in the drawing is a motion, infrared, optoelectronic or other type of "sensor" 15 to detect oncoming cars to turn off peripheral beams automatically or to turn off brights if this option is chosen. However, it should be noted that a driver can overide this function through manual means or automatic means to defeat the the sensor peripheral/bright "off" function when oncoming cars approach if desired if allowed by law.

FIG. 10C is another alternate embodiment of a peripheral beam advanced headlamp system for a motorcycle showing a cross-section view from FIG. 8 whereby in the cross section it is illustrated that there is a peripheral beam advanced headlamp system with a "headlamp housing" shown for a motor vehicle which contains a forward driving light beam filament 14f" and its dedicated light reflector 16" behind it to shine light in the forward direction and additional "peripheral light beam filaments" 14", where in this figure the additional peripheral light beam filaments and reflectors are placed one to shine at 45 degrees from the forward driving beam on the right of the forward driving beam each of which can be turned on and off selectively and made to switch from parking lights status, to normal, to low or bright lights status through switching means. Not shown in FIG. 10C but that can be included are "turning signal indicators" as such are shown in FIGS. 1, 8, and 13 with their respective electrode connections as "electrode connections" 18 for each of the light filament bulbs are shown in FIGS. 2, 3 and 4. Also shown in FIG. 10C is the headlamp housing "lens" 12 whereby the light of the light of the forward light filament bulbs and the peripheral light filament bulbs passes through the headlamp housing. It should be noted that each advanced peripheral beam headlamp is comprised with at least one forward light filament beam 14f and its reflector 16 and that each advanced peripheral beam headlamp has at least one or more peripheral beams 14 in it placed at an angle from the forward driving beam to shine light in a peripheral direction to illuminate the sides of the vehicle as. desired each having a dedicated reflector 16. Also shown in the drawing is a motion, infrared, optoelectronic or other type of "sensor" 15 to detect oncoming cars to turn off peripheral beams automatically or to turn off brights if this option is chosen. However, it should be noted that a driver can overide this function through manual means or automatic means to defeat the sensor peripheral/bright "off" function when oncoming cars approach if desired if allowed by law.

FIG. 11 is a fragmentary perspective view of a peripheral beam advanced headlamp system showing horizontal swiveling of one light assembly whereby it is illustrated that there is a peripheral beam advanced headlamp system with a "headlamp housing" shown for motorcycles, or other vehicles, boats, or other applications which contains a forward driving light beam filament 14f and its dedicated light reflector 16' behind it to shine light in the forward direction and additional "peripheral light beam filaments" 14, where in this figure the additional peripheral light beam filaments and reflectors are placed one to shine at 45 degrees, or at other angle(s) from the forward driving beam on the left of the forward driving beam and where said periperal beams in this example have a motorized mechanical "servo" 32' and or mechanisms that can rotate the light beam and or its reflector in a horizontal motion to vary the beam angle as desired and whereby the beams can be turned on and off selectively and made to switch from parking lights status, to normal, to low or bright lights status through switching means through electrode connectors 18 as shown in FIGS. 2, 3, and 4. Not shown in FIG. 11 but that can be included are "turning signal indicators" 20 as such are shown in FIGS. 1, 8 and 13 with their respective electrode connections as "electrode connections" 18 for each of the light filament bulbs as are shown in FIGS. 2, 3, and 4. It should be noted that each advanced peripheral beam headlamp is comprised with at least one forward light filament beam 14f and its reflector 16 and that each advanced peripheral beam headlamp has at least one or more peripheral beams 14 to include swiveling and non-swiveling versions of peripheral beam and reflector technologies in them placed at an angle from the forward driving beam to shine light in a peripheral direction to illuminate the sides of the vehicle as desired each having a dedicated reflector 16. Also shown in the drawing is a motion, infrared, optoelectronic or other type of "sensor" 15 to detect oncoming cars to turn off peripheral beams automatically or to turn off brights if this option is chosen. However, it should be noted that a driver can overide this function through manual means or automatic means to defeat the sensor peripheral/bright "off" function when oncoming cars approach if desired if allowed by law.

FIG. 12 is a fragmentary perspective view of a peripheral beam advanced headlamp system showing bidirectional swivelling of the light beam/reflector unit within the headlamp housing in both horizontal and in vertical directions whereby it is illustrated that there is a peripheral beam advanced headlamp system with a "headlamp housing" 10 shown for motorcycles, or other vehicles, boats, or other applications which contains a forward driving light beam filament 14f and its dedicated light reflector behind it to shine light in the forward direction (not shown) and additional "peripheral light beam filaments" 14' (here one bidirectional swiveling unit is shown), where in this figure the additional peripheral beam filaments and reflectors can be placed to shine at 45 degrees, or at other angle(s) from the forward driving beam on the left of the forward driving beam and where said periperal beams in this example have a motorized horizontal electromechanical "servo" 36 and or mechanisms that can rotate the light beam and or its reflector in a horizontal motion and in a vertical motion through a vertical electromechanical servo 38 and or mechanisms to vary the light beam angle and or its reflector as desired and whereby the beams can be turned on and off selectively and made to switch from parking lights status, to normal, to low or bright lights status through switching means through electrode connectors 18 as shown in FIGS. 2, 3, and 4. Not shown in FIG. 12 but that can be included are units where this bi-directional swiveling peripheral beam can be incorporated to include "turning signal indicators" 20 as such are shown in FIGS. 1, 8 and 13 with their respective electrode connections as "electrode connections" 18 for each of the light filament bulbs as are shown in FIGS. 2, 3, and 4. It should be noted that each advanced peripheral beam headlamp is comprised with at least one forward light filament beam 14f and its reflector 16 and that each advanced peripheral beam headlamp has at least one or more peripheral beams 14 in it placed at an angle from the forward driving beam to shine light in a peripheral direction to illuminate the sides of the vehicle as desired each having a dedicated reflector 16.

FIG. 13 is a fragmentary perspective view of the advanced headlamp system shown on the rear of an automobile as a tail light assembly 30 having peripheral beam technology whereby a "headlamp housing" contains a light filament beam 14r' that is a backward or reverse driving beam and peripheral light beams 14' placed at angles from the forward driving beam 14r' to fill the "headlamp housing" 30'. Also contained in the headlamp housing are "turning light indicators" 20 as in the motorcycle variations of the advanced headlamp system with peripheral beam technology. Also shown in FIG. 8 is the headlamp housing "lens" 12 whereby the light of the light of the forward light filament bulbs and the peripheral light filament bulbs passes through the headlamp housing 10'.

FIG. 14 is a logic circuit block diagram of the advanced headlamp system having peripheral beam technology whereby there are various circuits, modules, and or systems including: "INFRARED, MOTION, LIGHT SENSITIVE, OR OTHER SENSORS FOR ONCOMING TRAFFIC OR OBJECTS" 54 which is a sensor module that interfaces and communicates with the: "LOGIC FOR SETTING LIGHTS TO DEFAULT INTENSITY & POSITION SETTINGS FOR ONCOMING TRAFFIC" 51 module which in turn interfaces and communicates with the: "ROM WITH PRE-PROGRAMMED POSITION AND INTENSITY SETTINGS AND MEMORY FOR USER PROGRAMMABILITY" 50 module which in turn interfaces and communicates with the: "INTENSITY CONTROLS WITH PARKING, LOW, NORMAL AND HIGH LEVELS" 52 module and with the "HORIZONTAL AND VERTICAL SERVOS FOR PERIPHERAL LAMPS" 56 module. The "HORIZONTAL AND VERTICAL SERVOS FOR PERIPHERAL LAMPS" 56 module interfaces and communicates with the: "HEADLAMPS AND REFLECTOR HOUSINGS WITH OR WITHOUT SERVO MOTORS" 53 modules. The "INTENSITY CONTROLS WITH PARKING, LOW, NORMAL AND HIGH LEVELS" 52 module also interfaces with the: "HEADLAMPS AND REFLECTOR HOUSINGS WITH OR WITHOUT SERVO MOTORS" 53 module. Further, "MANUAL CONTROLS FOR ACTIVATION, FOR INTENSITY AND POSITION OF PERIPHERAL LAMPS" 55 module also interface and communicate with the: "INTENSITY CONTROLS WITH PARKING, LOW, NORMAL AND HIGH LEVELS" 52 module and with the: "HORIZONTAL AND VERTICAL SERVOS FOR PERIPHERAL LAMPS" 56 module to control the lighting intensities and the angular direction of all the light filament bulbs in the forward lighting beams and in the peripheral beams and their reflectors and the light beam angles that they reflect.

The advanced headlamp system can be comprised in a variety of configurations and models such as having: (3) three light filaments, the forward light filament, the 45-degree filament, and the 90-degree filament, or other configurations. It also contains the filament reflectors that shape the angle of the light that the light will shine at for each filament.

The headlamp housing also contains the electrical connections that connect to the electrical system of the vehicle to turn the light beams on or off selectively as indicated in the specification. The light filaments are powered by the vehicle's power system when they are connected to the electrical system of the vehicle and are connected and installed into the headlamp housing. There are at least 2-3 light filaments per headlamp housing to create a headlamp with peripheral beam technology capability. Three light filaments are suggested and are built into each headlamp housing, one for a forward beam, one at a 45-degree angle (pointing right for passenger, pointing left for driver side), one at a 90-degree angle (pointing right for passenger, pointing left for driver side). However, these configurations may vary and there may be one forward beam and one peripheral beam at 45 degrees, or there may be one forward beam and one peripheral beam at 90 degrees, or there may be one forward beam and two peripheral beams one at 45 degrees and one at 90 degrees and or more or less peripheral beams and to include their dedicated reflectors and they can be at different angles to accommodate more or less peripheral beams. Also, there can be peripheral beam type headlights to include and direct servo controlled peripheral beams and their dedicated reflectors that can control and direct the peripheral beams and their dedicated reflectors by a driver to move said peripheral beams and their dedicated reflector(s) horizontally and vertically to areas chosen by a driver. These can be developed for single type headlights for driver-side and passenger side peripheral beams within a headlamp housing whereby they will default to their normal vertical and horizontal position(s) after a driver is done viewing a special area. The headlamp housing, contains the light filaments, the forward light filament, the 45-degree filament, and the 90-degree filament, or other forward light beam and peripheral light beam configurations with or without servo motors and mechanisms in various models to turn peripheral beams in vertical and horizontal directions and sensors to turn off bright lights or peripheral beams when cars approach in various models. It also contains the filament reflectors that shape the angle of the light that the light will shine at for each filament. The headlamp housing also contains the electrical connections that connect to the electrical system of the vehicle to turn the light beams on or off selectively as indicated in the specification. The headlamp housing can be made out of glass, or tempered plastic designed to withstand high temperatures and to transmit light and to withstand temperature deviations and bad weather and harsh conditions commonly known to vehicles and their uses. Materials used can be those commonly found in the industry. The shape and size of the advanced headlamp system can vary, however, the headlamp housing should be designed in a manner to accommodate at least one or more light filaments and their respective reflectors and their electrical connectors in the headlamp housing so that peripheral light beam technology can become a reality.

The filament reflectors are connected and installed into the headlamp housing behind the light filaments. There are as many filament reflectors as there are light filaments per headlamp housing to create a headlamp with peripheral beam technology capability. Three light reflectors and filaments are suggested and are built into each headlamp housing, one for a forward beam, one at a 45-degree angle (pointing right for passenger, pointing left for driver side), one at a 90-degree angle (pointing right for passenger, pointing left for driver side).

The electrical connectors of the headlamp assembly connect the forward light beam filament, the 45-degree light filament, and the 90-degree light filament, or the other configurations that may be available, to the power system of the vehicle through the circuit system of the vehicle, subject to the controls, switches, and the programmable settings of the headlamp system as indicated.

The circuit card of the headlamp system allows the programmability of the headlamp system to allow the driver to set the headlamp system to turn off the bright lights or the peripheral beams of the headlamp system at a certain distance when an oncoming car approaches utilizing a motion sensor, or an infra-red sensor, or other type of sensor. The circuit card of the headlamp system has the buttons, switches, rotary and otherwise, and the logic circuits necessary for the control of the advanced headlamp system to turn the peripheral beam technology on or off and to program the beams to go off when a car or a vehicle approaches at a certain distance. The circuits can be on one card, they contain all the logic circuits, they can be split up over more than one circuit card, and they are connected to the headlamps and to the power source of the vehicle.

The switching means of the headlamp system contains a switch that allows a rotary switch or other switch when turned to first turn on the parking lights then the forward lights, then when turned a little more, it turns on the next peripheral beam which may be the 45-degree beam, then when turned a little more it turns on the 90-degree peripheral beam. Clicking that lever that the rotary switch or other switch is on can also turn on the high beam for every beam. The Switching Means can take on many forms including rotary, sliding means, clicking means, toggle means, or other means to selectively turn on the peripheral beams of the advanced headlamp system and to control the programmable functions of the system.

The oncoming car sensor, motion sensor, infra-red sensor, or other type of sensor, (an optional feature), utilizing the logic circuits in the circuit card, provides a signal to the headlamp system when an oncoming car approaches when it comes within a certain distance as programmed to optionally turn off the bright lights of the vehicle, or to optionally turn off the peripheral beam technology. There are a variety of sensors that can be used for detecting an oncoming vehicle, including a motion sensor, an infrared sensor, or other types of sensors. This sensor is then used to optionally turn off the bright lights or the peripheral lights of the advanced headlamp system when an oncoming car approaches.

The light filaments are powered by the vehicle's power system when they are connected to the electrical system of the vehicle and are connected and installed into the headlamp housing. There are at least 2-3 light filaments per headlamp housing to create a headlamp with peripheral beam technology capability. Three light filaments are. suggested and are built into each headlamp housing, one for a forward beam, one at a 45-degree angle (pointing right for passenger, pointing left for driver side), one at a 90-degree angle (pointing right for passenger, pointing left for driver side). The light filaments bulbs are powered by the vehicle's power system when they are connected to the electrical system of the vehicle and are connected and installed into the headlamp housing. There are at least 2-3 light filament bulbs per headlamp housing to create a headlamp with peripheral beam technology capability. Three light filament bulbs are suggested and are built into each headlamp housing, one for a forward beam, one at a 45-degree angle (pointing right for passenger, pointing left for driver side), one at a 90-degree angle (pointing right for passenger, pointing left for driver side). Each bulb will have the double filament ability to go from low-beam ability to high-beam ability as well. The light filament technology used in the advanced peripheral beam headlamp system can be of any type used in the industry as those found in the industry, but they are to be combined in a multiple fashion to provide an advanced headlamp system with peripheral beam technology not commonly found in the industry.

The reflector technology used in the advanced peripheral beam headlamp system can be of any type used in the industry as those found in the industry, but they are to be combined in a multiple fashion to provide an advanced headlamp system with peripheral beam technology not commonly found in the industry.

The connectors of the headlamp assembly are conductive and are designed for the flow of electricity and are like other connectors found on headlamp systems commonly found in the industry, are designed for low-beam and high-beam selectivity and are designed to connect to every light filament within the headlamp housing. Thus, if the headlamp housing has (3) three light filaments, there will be enough electrical connectors to provide for low-beam and high-beam selectivity for all (3) three light filament bulbs.

The interconnections of the main components and the sub-components of the advanced headlamp system are as follows:

The headlamp housing contains at least one or more light filament reflectors which are positioned behind one or more light filament bulbs: for example, one pointing forward, and peripheral beams: one at a 45-degree angle, and one at 90-degrees of the forward directed beam in the headlamp housing. In a vehicle such as a car where there is a left side and a right side, the 45-degree and the 90-degree sides, are biased and one points to the left (the driver's side), and one points to the right, (the passenger's side). This accomplishes three beam configurations in a headlamp housing: one that points forward, one that points at a 45-degree angle, and one that points at a 90-degree angle from the forward beam direction. The three-beam configuration includes (2) beams in this example that are peripheral beams: the 45-degree beam from the forward beam, and the 90-degree beam.

Also, the three-beam configuration also includes the normal forward beam, and the normal low-beam and high-beam options for the forward beam. In addition, the peripheral beams also have the ability to select a low-beam or a high-beam as may be desired.

The technology can be applied to fog lights and other technologies as well in the same fashion. The headlamp housing has thus on the inside of it at least one or more light filament bulbs with their respective light filament reflectors, and on the outside their connectors protrude to connect to the vehicle's electrical system which also contains electrical switches, and logic circuits to control the advanced headlamp system on and off and to turn each peripheral beam on and off selectively and to control its functionalities including its feature to automatically turn off the bright lights of the vehicle or the peripheral beam(s) of the vehicle when an oncoming car approaches when the sensor senses an oncoming vehicle approaching within its programmed distance.

Variations of the advanced headlamp system include configurations of an advanced headlamp system where an advanced headlamp system can be devised where any number of light filament bulbs can be used beyond the singular forward light beam used in normal headlamp designs.

Further variations include peripheral beams to be included in tail lights where there can be one or more peripheral beam configuration(s) in one or more angles with dedicated reflector(s). Further variations include peripheral beam filaments and reflectors that can swivel in vertical and in horizontal directions in the same headlamp housing in addition to the forward driving beam that are electromechanically adjusted by the driver through a servo motor and mechanisms for special viewing and where said peripheral beam(s) come to rest in default programmed, preset or factory preset vertical and horizontal position(s) after special viewing is terminated.

Thus the main operation of my invention is to provide light through a newly designed headlamp system and headlamp assembly containing both regular beam, high beam filaments as regular headlamps having reflectors and assemblies as other headlamps and systems on the market, but having multiple reflectors and filaments positioned within the headlamp assembly to: 1) provide light in the forward direction, and filaments and reflectors built into the headlamp assembly to provide light in 2) angled directions proceeding outwardly from the forward direction proceeding to the left on the driver's side containing at least (1) one to (2) two extra filaments and reflectors to the left and to the right on the passenger's side. These extra filaments and reflectors may be placed and angled one to shine light in the forward direction as mentioned, the second to shine light at 45-degrees left on the driver's side of the vehicle, and the third filament and reflector may shine light at 90-degrees of the forward shining reflector and filament.

The same approach may be used on the passenger side with the opposite configuration where there will be a forward filament and reflector, one that shines 45-degrees to the right on the passenger's side, and one 90-degrees from the forward shining reflector and filament. The headlamp housing contains at least one or more filament reflectors which are positioned behind one or more light filament bulbs, for example: one pointing forward, one at a 45-degree angle, and one at 90-degrees of the forward directed beam in the headlamp housing. In a vehicle such as a car where there is a left side and a right side, the 45-degree and the 90-degree sides, are biased and one points to the left (the driver's side), and one points to the right, (the passenger's side).

This accomplishes three beam configurations in a headlamp housing: one that points forward, one that points at a 45-degree angle, and one that points at a 90-degree angle from the forward beam direction. The three beam configuration includes (2) beams in this example that are peripheral beams: the 45-degree beam from the forward beam, and the 90-degree beam. Also, the three beam configuration also includes the normal forward beam, and the normal low-beam and high-beam options for the forward beam. In addition, the peripheral beams also have the ability to select a low-beam or a high-beam as may be desired.

The technology can be applied to fog lights and other technologies as well in the same fashion. The headlamp housing has thus on the inside of it at least one or more light filament bulbs with their respective light filament reflectors, and on the outside their connectors protrude to connect to the vehicle's electrical system which also contains electrical switches, and logic circuits to control the advanced headlamp system on and off and to turn each peripheral beam on and off selectively and to control its functionalities including its feature to automatically turn off the bright lights of the vehicle or the peripheral beam(s) of the vehicle when an oncoming car approaches when the sensor senses an oncoming vehicle approaching within its programmed distance.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Referring now to FIG. 15 a light assembly 500 is disclosed having a sealed compartment 501 having a plurality of light sources (filaments) 502 and a plurality of reflective surfaces 503 located immediately within an interior 504 of the sealed compartment 501. As stated above, the "housing" of the application is a sealed compartment 501 containing the plurality of light sources (filaments) 502 and plurality of reflective surfaces 503. The sealed compartment 501 limits or eliminates the exchange of a gas 505 between the interior 504 and an exterior 506 of the sealed compartment 501. Further, in some embodiments, the interior 504 of the sealed compartment 501 may contain an inert gas 507 which reduces the chances of the filaments 502 burning out. It should be noted that, alternatively, the sealed compartment 501 may contain ambient air 515 or may be in a vacuum. Light beams 520 emitted from the multiple light sources 502 are emitted in a non-parallel direction. The light beams 520 may cross through a protective transparent layer 575 of the sealed compartment 501. More specifically, the protective transparent layer 575 of the sealed compartment 501 may be constructed from, for example, glass or plastic. Further, the transparent layer 575 of the sealed compartment 501 may reduce or eliminate the exchange of a gas 505 between the interior 504 and exterior 506 of the sealed compartment 501. As a result, the assembly 500 allows a user to view objects located, for example, in front of and/or on the side of the user.

The light sources (filament) 502 and the reflective surfaces 503 may be an immediate structure of the light assembly 500. More specifically, the light sources 502 and the reflective surfaces 503 may be the only structures located within the light assembly 500. In an embodiment, a sensor 550 may also be located within the sealed compartment 501 in addition to the light sources 502 and the reflective surfaces 503. A servo motor 600 may control the movement of the reflective surfaces 503 so as to allow the user to aim the light beams 520. The sensor 550 may be a motion sensor, or an infra-red sensor, or another type of sensor 550. More specifically, the sensors 550 may, for example, detect the presence of a car, animal or other object located in the vicinity of the light assembly.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

I claim:

1. A light assembly comprising:
   a sealed compartment;
   a plurality of light sources located immediately within the sealed compartment wherein the light sources are capable of emitting light and wherein the direction of light emitted from a first light source is non-parallel to the direction of light emitted from a second light source;
   a plurality of reflective surfaces located within the sealed compartment wherein the reflective surfaces reflect light emitted by the light sources;
   a plurality of servo motors in communication with the light sources wherein the servo motors move the light sources and wherein the servo motors are located within the sealed compartment; and
   a sensor located directly within the sealed compartment wherein the sensor is connected to at least one of the light sources.

2. The light assembly of claim 1 wherein an inert gas is located within the sealed compartment.

3. The light assembly of claim 1 wherein the light sources are capable of producing a standard automotive low beam of light.

4. The light assembly of claim 1 wherein the light sources capable of producing a standard automotive high beam of light.

5. The light assembly of claim 1 further comprising:
   a control switch manually operated by a user wherein the control switch controls an amount of light emitted by the light sources.

6. The light assembly to claim 1 wherein an amount of light emitted by the plurality of light sources returns to a preprogrammed level after the sensor is activated.

7. The light assembly of claim 1 wherein the sensor controls an amount of light emitted by the light sources after the sensor is activated.

8. The light assembly of claim 1 wherein a servo motor in communication with the reflective surface moves the light sources and the reflective surfaces.

9. The light assembly of claim l wherein none of the light emitted from each of the plurality of light sources overlaps.

10. The light assembly of claim 1 wherein the light emitted from at least two of the plurality of light sources overlap each other.

11. The light assembly of claim 1 wherein an amount of light emitted from each of the plurality of light sources may be different.

* * * * *